(12) United States Patent
Mii et al.

(10) Patent No.: US 9,879,127 B2
(45) Date of Patent: Jan. 30, 2018

(54) SEMIAROMATIC POLYAMIDE RESIN COMPOSITION AND MOLDED BODY FORMED BY MOLDING SAME

(71) Applicant: UNITIKA LTD., Hyogo (JP)

(72) Inventors: Junichi Mii, Kyoto (JP); Yutaka Taketani, Kyoto (JP); Taiyo Amari, Kyoto (JP); Hiroo Kamikawa, Kyoto (JP); Yohei Kabashima, Kyoto (JP)

(73) Assignee: UNITIKA LTD., Hyogo (JP)

( * ) Notice: Subject to any disclaimer, the term of this patent is extended or adjusted under 35 U.S.C. 154(b) by 0 days.

(21) Appl. No.: 14/769,206

(22) PCT Filed: Mar. 19, 2014

(86) PCT No.: PCT/JP2014/057433
§ 371 (c)(1),
(2) Date: Aug. 20, 2015

(87) PCT Pub. No.: WO2014/148519
PCT Pub. Date: Sep. 25, 2014

(65) Prior Publication Data
US 2015/0376377 A1  Dec. 31, 2015

(30) Foreign Application Priority Data

Mar. 21, 2013 (JP) ................. 2013-058468
Oct. 7, 2013 (JP) ................. 2013-210235

(51) Int. Cl.
| | | |
|---|---|---|
| C08L 77/00 | (2006.01) |
| D21H 17/55 | (2006.01) |
| C08G 69/26 | (2006.01) |
| C08K 7/14 | (2006.01) |
| C08K 5/5313 | (2006.01) |
| C08L 77/06 | (2006.01) |
| C08K 3/22 | (2006.01) |
| C08K 3/34 | (2006.01) |
| C08K 7/04 | (2006.01) |
| C08K 3/32 | (2006.01) |
| C08K 5/51 | (2006.01) |
| C08K 5/521 | (2006.01) |
| C08K 7/06 | (2006.01) |

(52) U.S. Cl.
CPC ................. *C08K 7/14* (2013.01); *C08K 3/22* (2013.01); *C08K 3/32* (2013.01); *C08K 3/34* (2013.01); *C08K 5/51* (2013.01); *C08K 5/521* (2013.01); *C08K 5/5313* (2013.01); *C08K 7/04* (2013.01); *C08K 7/06* (2013.01); *C08L 77/06* (2013.01); *C08K 2003/2227* (2013.01); *C08K 2003/329* (2013.01)

(58) Field of Classification Search
None
See application file for complete search history.

(56) References Cited

U.S. PATENT DOCUMENTS

| 7,255,814 B2 | 8/2007 | Hoerold et al. |
| 2008/0274355 A1* | 11/2008 | Hewel ................. C08G 69/265 |
| | | 428/402 |
| 2009/0062452 A1 | 3/2009 | Harder et al. |
| 2009/0275683 A1 | 11/2009 | Lee et al. |
| 2010/0249292 A1 | 9/2010 | Saga et al. |
| 2012/0029124 A1 | 2/2012 | Norfolk et al. |
| 2012/0083558 A1 | 4/2012 | Bayer et al. |
| 2013/0217814 A1 | 8/2013 | Yu |
| 2014/0228489 A1 | 8/2014 | Nakai et al. |

FOREIGN PATENT DOCUMENTS

| CN | 101372555 | 2/2009 |
| CN | 101570633 | 11/2009 |
| CN | 2010/002403 | 1/2010 |
| CN | 101735609 | 6/2010 |
| CN | 101891953 | 11/2010 |
| CN | 102076752 | 5/2011 |
| CN | 102388095 | 3/2012 |
| CN | 102459444 | 5/2012 |
| CN | 102464881 | 5/2012 |
| CN | 103827172 | 5/2014 |
| EP | 1956048 | 8/2008 |
| EP | 2028231 | 2/2009 |
| EP | 2759562 | 7/2014 |
| JP | 2004-263188 | 9/2004 |

(Continued)

OTHER PUBLICATIONS

International Search Report in corresponding PCT application PCT/JP2014/057433.
English language machine translation of JP 2007-023206.
English language machine translation of JP 2010-254760.
English language machine translation of JP 2009-263503.
English language machine translation of JP 2013-064032.
English language machine translation of JP 2014-101494.
Extended European Search Report in corresponding European Application No. 14768954.1.
English language machine translation of.
Office Action in corresponding Chinese Patent Application No. 201480004939.3, dated Aug. 18, 2016.

(Continued)

*Primary Examiner* — Robert T Butcher
(74) *Attorney, Agent, or Firm* — Fildes & Outland, P.C.

(57) ABSTRACT

Disclosed is a semiaromatic polyamide resin composition including a semiaromatic polyamide (A), a phosphorus-based flame retardant (B) and an inorganic aluminum compound (C), wherein the mass ratio (A/B) between (A) and (B) is 50/50 to 95/5; the amount of the inorganic aluminum compound (C) is 0.1 to 20 parts by mass in relation to 100 parts by mass of the total amount of (A) and (B); (A) is constituted with an aromatic dicarboxylic acid component, an aliphatic diamine component and a monocarboxylic acid component; and the content of the monocarboxylic acid component is 0.3 to 4.0 mol % in relation to the whole monomer components constituting (A).

10 Claims, 1 Drawing Sheet

(56) References Cited

FOREIGN PATENT DOCUMENTS

| | | |
|---|---|---|
| JP | 2007-023206 | 2/2007 |
| JP | 2009-263503 | 11/2009 |
| JP | 2009-270107 | 11/2009 |
| JP | 2010-254760 | 11/2010 |
| JP | 2011-526940 | 10/2011 |
| JP | 2012-528904 | 11/2012 |
| JP | 2013-064032 | 4/2013 |
| JP | 2014-101494 | 6/2014 |
| WO | 2010/002403 | 1/2010 |
| WO | 2013/042541 | 3/2013 |

OTHER PUBLICATIONS

English language machine translation of CN 101735609.
English language machine translation of CN 101891953.
Office Action in corresponding Chinese Patent Application No. 201480004939.3, dated Apr. 12, 2017.
English translation of Office Action in corresponding Chinese Patent Application No. 201480004939.3, dated Apr. 12, 2017.

* cited by examiner

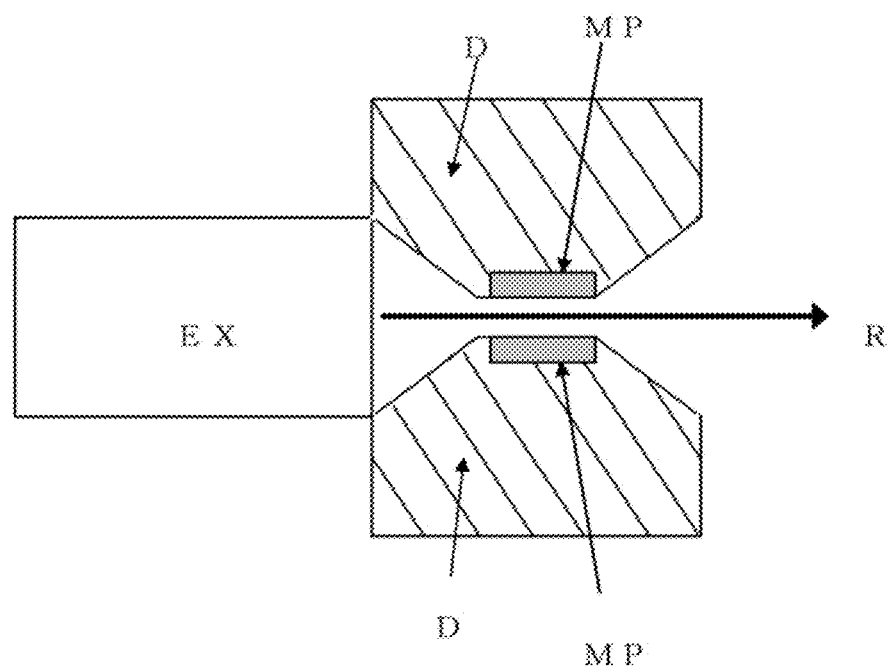

SEMIAROMATIC POLYAMIDE RESIN COMPOSITION AND MOLDED BODY FORMED BY MOLDING SAME

TECHNICAL FIELD

The present invention relates to a semiaromatic polyamide resin composition having flame retardancy, and at the same time, being excellent in mold release property during molding, and further, being small in the amount of generated gas at the temperature during melt processing.

BACKGROUND ART

Semiaromatic polyamides are excellent in low water absorption property as well as in heat resistance and mechanical properties, and are used in a lot of electric and electronic components and in peripheral components of engines in vehicles. The semiaromatic polyamides used in the electric and electronic components, among these components, are required to have further higher degree of flame retardancy.

As a method for imparting flame retardancy to resins, methods using flame retardants are usually adopted. Recently, from the growing environmental awareness, halogen-based flame retardants have been avoided, and in general, nonhalogen-based flame retardants have been used.

For example, Patent Literature 1 and Patent Literature 2 disclose the use of the mixtures, as nonhalogen-based flame retardants, each composed of the reaction product between melamine and phosphoric acid, a phosphinic acid salt and a metal compound, and any of these mixtures is disclosed to satisfy the flame retardancy standard, the UL94 V-0 standard, in a 1/16-inch molded product.

However, a resin composition including a polyamide and a phosphinic acid salt is significant in metal corrosion. Accordingly, such a composition intensively abrades, during melt processing, the metal components such as the screw and the die of an extruder, and the screw and the die of a molding machine, and hence is disadvantageously poor in mass productivity. Such a composition also disadvantageously generates a large amount of gas during molding processing the composition and causes attachment of contamination to the die.

With respect to these problems, the present inventors have disclosed, in Patent Literature 3, a technique to suppress the metal corrosion and the generation of gas by using boehmite as a stabilizer in the resin composition including a polyamide and a phosphinic acid salt.

CITATION LIST

Patent Literature

Patent Literature 1: JP2004-263188A
Patent Literature 2: JP2007-023206A
Patent Literature 3: JP2010-254760A

SUMMARY OF INVENTION

Technical Problem

However, when this technique is applied to the melt processing of a semiaromatic polyamide, being high in the processing temperature, the gas generation during extrusion or molding sometimes cannot be sufficiently suppressed, and the molded bodies molded from the semiaromatic polyamide are sometimes poor in mold release property.

The present invention solves the above-described problems, and takes as its object the provision of a semiaromatic polyamide resin composition excellent in mold release property as well as in mechanical properties, heat resistance and flame retardancy, and small in the amount of generated gas at the temperature during molding processing.

Solution to Problem

The present inventors performed a continuous diligent study in order to solve the foregoing technical problem, and consequently have reached the present invention by discovering that the foregoing technical problem can be solved by using, as the semiaromatic polyamide, a semiaromatic polyamide including a specific amount of a monocarboxylic acid component. Specifically, the gist of the present invention is as follows.

(1) A semiaromatic polyamide resin composition including: a semiaromatic polyamide (A), a phosphorus-based flame retardant (B) and an inorganic aluminum compound (C), wherein the mass ratio (A/B) between the semiaromatic polyamide (A) and the phosphorus-based flame retardant (B) is 50/50 to 95/5; the amount of the inorganic aluminum compound (C) is 0.1 to 20 parts by mass in relation to 100 parts by mass of the total amount of the semiaromatic polyamide (A) and the phosphorus-based flame retardant (B); the semiaromatic polyamide (A) is constituted with an aromatic dicarboxylic acid component, an aliphatic diamine component and a monocarboxylic acid component; and the content of the monocarboxylic acid component is 0.3 to 4.0 mol % in relation to the whole monomer components constituting the semiaromatic polyamide (A).

(2) The semiaromatic polyamide resin composition according to (1), wherein the monocarboxylic acid component includes a monocarboxylic acid having a molecular weight of 140 or more.

(3) The semiaromatic polyamide resin composition according to (1) or (2), wherein the monocarboxylic acid component includes an aliphatic monocarboxylic acid.

(4) The semiaromatic polyamide resin composition according to (3), wherein the aliphatic monocarboxylic acid is stearic acid.

(5) The semiaromatic polyamide resin composition according to any one of (1) to (4), wherein the aliphatic diamine component includes 1,10-decanediamine.

(6) The semiaromatic polyamide resin composition according to any one of (1) to (5), wherein the aromatic dicarboxylic acid component includes terephthalic acid.

(7) The semiaromatic polyamide resin composition according to any one of (1) to (6), wherein the phosphorus-based flame retardant (B) is a phosphinic acid salt and/or a diphosphinic acid salt.

(8) The semiaromatic polyamide resin composition according to (7), wherein the phosphinic acid salt is a compound represented by the following general formula (I), and the diphosphinic acid salt is a compound represented by the following general formula (II):

[Formula 1]

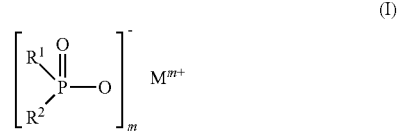

[Formula 2]

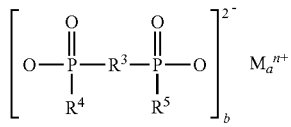

(II)

(wherein in the formulas, $R^1$, $R^2$, $R^4$ and $R^5$ each independently represent a linear or branched alkyl group having 1 to 16 carbon atoms and/or a phenyl group; $R^3$ represents a linear or branched alkylene group having 1 to 10 carbon atoms, an arylene group having 6 to 10 carbon atoms, an arylalkylene group or an alkylarylene group; M represents a calcium ion, an aluminum ion, a magnesium ion or a zinc ion; m is 2 or 3; and n, a and b are integers satisfying a relation, 2×b=n×a.)

(9) The semiaromatic polyamide resin composition according to any one of (1) to (8), wherein the inorganic aluminum compound (C) is one or more selected from the group consisting of aluminum oxide, boehmite and aluminum silicate.

(10) The semiaromatic polyamide resin composition according to any one of (1) to (9), further including a fibrous reinforcing material (D) in an amount of 5 to 200 parts by mass in relation to 100 parts by mass of the total amount of the semiaromatic polyamide (A) and the phosphorus-based flame retardant (B).

(11) The semiaromatic polyamide resin composition according to (10), wherein the fibrous reinforcing material (D) is one or more selected from the group consisting of glass fiber, carbon fiber and metal fiber.

(12) A molded body formed by molding the semiaromatic polyamide resin composition according to any one of (1) to (11).

Advantageous Effects of Invention

According to the present invention, it is possible to provide a semiaromatic polyamide resin composition excellent in mold release property as well as in mechanical properties, heat resistance and flame retardancy, suppressed in the metal corrosion at high temperatures, and small in the amount of generated gas at the temperature during molding processing.

BRIEF DESCRIPTION OF DRAWING

FIG. 1 is a diagram illustrating an apparatus for evaluating metal corrosion.

DESCRIPTION OF EMBODIMENTS

Hereinafter, the present invention is described in detail.
The semiaromatic polyamide resin composition of the present invention includes a semiaromatic polyamide (A), a phosphorus-based flame retardant (B) and an inorganic aluminum compound (C).

In the present invention, the semiaromatic polyamide (A) is constituted with an aromatic dicarboxylic acid component, an aliphatic diamine component and a monocarboxylic acid component.

In the present invention, examples of the aromatic dicarboxylic acid component constituting the semiaromatic polyamide (A) include terephthalic acid, phthalic acid, isophthalic acid and naphthalene dicarboxylic acid; among these, terephthalic acid is preferable because of being capable of improving heat resistance.

In addition to the aromatic dicarboxylic acid component, examples of the polymerizing component include the following dicarboxylic acids: aliphatic dicarboxylic acids such as oxalic acid, malonic acid, succinic acid, glutaric acid, adipic acid, pimelic acid, suberic acid, azelaic acid, sebacic acid, undecanedioic acid and dodecanedioic acid; and alicyclic dicarboxylic acids such as cyclohexanedicarboxylic acid. However, in order not to degrade the heat resistance of the semiaromatic polyamide (A), the aromatic dicarboxylic acid other than terephthalic acid, the aliphatic dicarboxylic acid or the alicyclic dicarboxylic acid preferably has a copolymerization proportion of 5 mol % or less in relation to the total number of moles of the raw material monomers, and is more preferably substantially not included.

In the present invention, examples of the aliphatic diamine component constituting the semiaromatic polyamide (A) include: 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 2-methyl-1,5-pentanediamine and 2-methyl-, 8-octanediamine. Among these, 1,10-decanediamine is preferable because of being satisfactory in the balance between the heat resistance and the mechanical properties. The aliphatic diamine components may be used each alone or in combinations thereof.

Examples of the copolymerizing component other than the aliphatic diamine component include alicyclic diamines such as cyclohexanediamine and aromatic diamines such as xylylenediamine and benzene diamine. However, because the alicyclic diamine or the aromatic diamine sometimes impairs the above-described properties provided by the aliphatic diamine component, the alicyclic diamine or the aromatic diamine preferably has a copolymerization proportion of 5 mol % or less in relation to the total number of moles of the raw material monomers, and is more preferably substantially not included.

In the present invention, the semiaromatic polyamide (A) may be copolymerized, if necessary, with lactams such as caprolactam and laurolactam or an m-aminocarboxylic acid such as 11-aminoundecanoic acid.

In the present invention, the semiaromatic polyamide (A) is required to include the monocarboxylic acid component as a constituent component thereof. The content of the monocarboxylic acid component is required to be 0.3 to 4.0 mol %, and is preferably 0.3 to 3.0 mol %, more preferably 0.3 to 2.5 mol % and furthermore preferably 0.8 to 2.5 mol %, in relation to the whole monomer components constituting the semiaromatic polyamide (A). When the content of the monocarboxylic acid component is less than 0.3 mol %, the improvement of the mold release property is sometimes not found, or the amount of generated gas sometimes cannot be suppressed at the temperature during molding processing. On the other hand, when the content of the monocarboxylic acid component exceeds 4.0 mol %, the mechanical properties or the flame retardancy is degraded. In the present invention, the content of the monocarboxylic acid means the proportion of the residue of the monocarboxylic acid in the semiaromatic polyamide (A), namely, the moiety formed by eliminating the hydroxyl group as a terminal group from the monocarboxylic acid.

As the monocarboxylic acid component, a monocarboxylic acid having a molecular weight of 140 or more is preferably included, and a monocarboxylic acid having a molecular weight of 170 or more is more preferably included. When the molecular weight of the monocarboxylic acid is 140 or more, the mold release property is improved, and the amount of generated gas can be suppressed at the temperature during molding processing, and the mold fluidity can also be improved.

Examples of the monocarboxylic acid component include an aliphatic monocarboxylic acid, an alicyclic monocarboxylic acid and an aromatic monocarboxylic acid; among these, an aliphatic monocarboxylic acid is preferable because of capable of reducing the amount of generated gas of the component derived from polyamide, reducing the die contamination and improving the mold release property.

Examples of the aliphatic monocarboxylic acid having a molecular weight of 140 or more include caprylic acid, nonanoic acid, decanoic acid, lauric acid, myristic acid, palmitic acid, stearic acid and behenic acid. Among these, stearic acid is preferable because of high versatility.

Examples of the alicyclic monocarboxylic acid having a molecular weight of 140 or more include 4-ethylcyclohexanecarboxylic acid, 4-hexylcyclohexanecarboxylic acid and 4-laurylcyclohexanecarboxylic acid.

Examples of the aromatic monocarboxylic acid having a molecular weight of 140 or more include 4-ethylbenzoic acid, 4-hexylbenzoic acid, 4-laurylbenzoic acid, 1-naphthoic acid, 2-naphthoic acid and derivatives of these.

The monocarboxylic acid components may be used each alone or in combinations thereof. A monocarboxylic acid having a molecular weight of 140 or more and a monocarboxylic acid having a molecular weight of less than 140 may be used in combination. In the present invention, the molecular weight of a monocarboxylic acid means the molecular weight of the monocarboxylic acid as a raw material.

In the present invention, the semiaromatic polyamide (A) has a relative viscosity, serving as an index of the molecular weight, of preferably 1.8 or more, more preferably 1.8 to 3.5 and furthermore preferably 1.9 to 3.1, as measured in 96% sulfuric acid, at 25° C., with a concentration of 1 g/dL. When the relative viscosity is less than 1.8, the mechanical properties are sometimes degraded.

The semiaromatic polyamide (A) can be produced by using the hitherto known method such as the heating polymerization method or the solution polymerization method. Among these, because of being industrially advantageous, the heating polymerization method is preferably used. Examples of the heating polymerization method include a method including a step (i) of obtaining a product from an aromatic dicarboxylic acid component, an aliphatic diamine component and a monocarboxylic acid component, and a step (ii) of polymerizing the obtained product.

Examples of the step (i) include a method in which the aromatic dicarboxylic acid powder and the monocarboxylic acid are mixed with each other, the resulting mixture is beforehand heated to a temperature equal to or higher than the melting point of the aliphatic diamine and equal to or lower than the melting point of the aromatic dicarboxylic acid, and the aliphatic diamine is added to the aromatic dicarboxylic acid powder and the monocarboxylic acid at this temperature in such a way that the state of a powder of the aromatic dicarboxylic acid is maintained, without allowing water to be included. Alternatively, examples of another method include a method in which a suspension composed of the aliphatic diamine in a molten state and the aromatic dicarboxylic acid in a solid state is stirred and mixed to prepare a mixed solution; then at a temperature lower than the melting point of the semiaromatic polyamide to be finally produced, the salt production reaction based on the reaction of the aromatic dicarboxylic acid, the aliphatic diamine and the monocarboxylic acid and the production reaction of a lower polymer based on the polymerization of the produced salt are performed; and thus, a mixture composed of the salt and the lower polymer is obtained. In this case, the reaction mixture may crushed while the reaction is being allowed to proceed, or alternatively, after the reaction, once the reaction mixture is taken out and then may be crushed. The step (i) is preferably the former step (i) easy in controlling the shape of the product.

Examples of the step (ii) include a method in which the product obtained in the step (i) is subjected to solid phase polymerization at a temperature lower than the melting point of the semiaromatic polyamide to be finally produced, so as to allow the molecular weight to be increased to the predetermined molecular weight, and thus the semiaromatic polyamide is obtained. The solid phase polymerization is preferably performed at a polymerization temperature of 180 to 270° C., with a reaction time of 0.5 to 10 hours, in a flow of an inert gas such as nitrogen.

The reaction apparatus of the step (i) and the reaction apparatus of the step (ii) are not particularly limited, and heretofore known apparatuses may be used for these apparatuses. The step (i) and the step (ii) may be performed with the same apparatus or may also be performed with different apparatuses.

The heating method in the heating polymerization method is not particularly limited; examples of the heating method include: a method in which the reaction vessel is heated with a medium such as water, vapor or a heat transfer oil; a method in which the reaction vessel is heated with an electric heater; and a method in which utilized is the frictional heat provided by the motion of the content, such as the heat of stirring generated by stirring. These heating methods may also be combined.

In the production of the semiaromatic polyamide (A), a polymerization catalyst may be used in order to increase the efficiency of the polymerization. Examples of the polymerization catalyst include phosphoric acid, phosphorous acid, hypophosphorous acid and the salts of these. The addition amount of the polymerization catalyst is usually preferably 2 mol % or less in relation to the total number of moles of the raw material monomers.

The semiaromatic polyamide resin composition of the present invention includes the phosphorus-based flame retardant (B).

In the present invention, the mass ratio (semiaromatic polyamide (A)/phosphorus-based flame retardant (B)) between the semiaromatic polyamide (A) and the phosphorus-based flame retardant (B) is required to be 50/50 to 95/5 and preferably 70/30 to 90/10. When the proportion of the phosphorus-based flame retardant (B) is less than 5% by mass, it is difficult to impart the necessary flame retardancy to the resin composition. On the other hand, when the proportion of the phosphorus-based flame retardant (B) exceeds 50% by mass, the resin composition is excellent in flame retardancy, but the resulting molded body is sometimes insufficient in mechanical properties and the melt kneading of the resin composition is sometimes difficult.

Examples of the phosphorus-based flame retardant (B) constituting the semiaromatic polyamide resin composition of the present invention include a phosphoric acid ester compound, a phosphinic acid salt and a diphosphinic acid salt.

Examples of the phosphoric acid ester compound include: trimethyl phosphate, triethyl phosphate, tributyl phosphate, trioctyl phosphate, tributoxyethyl phosphate, triphenyl phosphate, tricresyl phosphate, cresyl diphenyl phosphate, octyl diphenyl phosphate, tri(2-ethylhexyl)phosphate, diisopropyl phenyl phosphate, trixylenyl phosphate, tris(isopropyl phenyl)phosphate, trinaphthyl phosphate, bisphenol A bisphosphate, hydroquinone bisphosphate, resorcinol bisphosphate, resorcinol-diphenyl phosphate and trioxybenzene triphosphate; the substitution products of these; and the condensation products of these. Among these, the phosphoric acid ester compounds are preferable because of hardly adhering to the die and resulting in the excellent heat resistance and moisture resistance of the molded body. The phosphoric acid ester compound may be a monomer, an oligomer, a polymer or a mixture of these. Specific examples of the commercial products of the phosphoric acid ester compound include the following products manufactured by Daihachi Chemical Industry Co., Ltd.: "TPP" [triphenyl phosphate], "TXP" [trixylenyl phosphate], "CR-733S" [resorcinol bis(diphenylphosphate)], "PX200" [1,3-phenylene-tetrakis(2,6-dimethylphenyl) phosphoric acid ester], "PX201" [1,4-phenylene-tetrakis(2,6-dimethylphenyl) phosphoric acid ester], and "PX202" [4,4'-biphenylene-tetrakis(2,6-dimethylphenyl) phosphoric acid ester]. These may be used each alone or in combination.

Examples of the phosphinic acid salt include the compounds represented by the following general formula (I), and examples of the diphosphinic acid salt include the compounds represented by the following general formula (II):

[Formula 1]

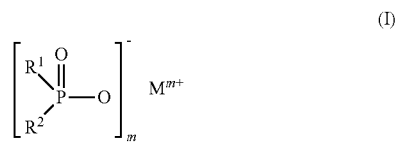

[Formula 2]

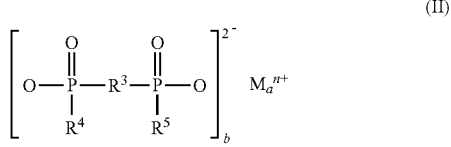

In these formulas, $R^1$, $R^2$, $R^4$ and $R^5$ are each independently required to be a linear or branched alkyl group having 1 to 16 carbon atoms and/or a phenyl group, and are each preferably a linear or branched alkyl group having 1 to 8 carbon atoms and/or a phenyl group, more preferably a methyl group, an ethyl group, an n-propyl group, an isopropyl group, an n-butyl group, a tert-butyl group, an n-pentyl group, an n-octyl group or a phenyl group, and furthermore preferably an ethyl group. $R^1$ and $R^2$ may form a ring with each other, and $R^4$ and $R^5$ may form a ring with each other.

$R^3$ is required to be a linear or branched alkylene group having 1 to 10 carbon atoms, or an arylene group having 6 to 10 carbon atoms, an arylalkylene group or an alkylarylene group. Examples of the linear or branched alkylene group having 1 to 10 carbon atoms include: a methylene group, an ethylene group, an n-propylene group, an isopropylene group, an isopropylidene group, an n-butylene group, a tert-butylene group, an n-pentylene group, an n-octylene group and an n-dodecylene group. Examples of the arylene group having 6 to 10 carbon atoms include a phenylene group and a naphthylene group. Examples of the alkylarylene group include a methylphenylene group, an ethylphenylene group, a tert-butylphenylene group, a methylnaphthylene group, an ethylnaphthylene group and a tert-butylnaphthylene group. Examples of the arylalkylene group include a phenylmethylene group, a phenylethylene group, a phenylpropylene group and a phenylbutylene group.

M represents a metal ion. Examples of the metal ion include a calcium ion, an aluminum ion, a magnesium ion and a zinc ion; an aluminum ion and a zinc ion are preferable, and an aluminum ion is more preferable.

Each of m and n represents the valence of the metal ion, m is 2 or 3, a represents the number of the metal ions, b represents the number of the diphosphinic acid ions, and n, a and b are the integers satisfying the relation "2×b=n×a."

The phosphinic acid salt and the diphosphinic acid salt are produced in aqueous solutions by using the corresponding phosphinic acid and diphosphinic acid, respectively, and metal carbonates, metal hydroxides or metal oxides, and are usually present as monomers; however, depending on the reaction conditions, the phosphinic acid salt and the diphosphinic acid salt are present in a form of a polymeric phosphinic acid salt having a degree of condensation of 1 to 3. Examples of the metal component include calcium ion, magnesium ion, aluminum ion and/or zinc ion.

Examples of the phosphinic acid used for the production of the phosphinic acid salt include: dimethylphosphinic acid, ethylmethylphosphinic acid, diethylphosphinic acid, methyl-n-propylphosphinic acid, isobutylmethylphosphinic acid, octylmethylphosphinic acid, methylphenylphosphinic acid and diphenylphosphinic acid; among these, diethylphosphinic acid is preferable.

Specific examples of the phosphinic acid salt represented by the general formula (I) include: calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate and zinc diphenylphosphinate. Among these, because of being excellent in the balance between flame retardancy and electrical properties, aluminum diethylphosphinate and zinc diethylphosphinate are preferable, and aluminum diethylphosphinate is more preferable.

Examples of the diphosphinic acid used for the production of the diphosphinic acid salt include methane-di(methylphosphinic acid) and benzene-1,4-di(methylphosphinic acid).

Specific examples of the diphosphinic acid salt represented by the general formula (II) include: calcium methane-di(methylphosphinate), magnesium methane-di(methylphosphinate), aluminum methane-di(methylphosphinate), zinc methane-di(methylphosphinate), calcium benzene-1,4-di(methylphosphinate), magnesium benzene-1,4-di(methylphosphinate), aluminum benzene-1,4-di(methylphosphinate) and zinc benzene-1,4-di(methylphosphinate). Among these, because of being excellent in the balance between flame retardancy and electrical properties, aluminum methane-di(methylphosphinate) and zinc methane-di(methylphosphinate) are preferable.

As the phosphorus-based flame retardant (B), a phosphinic acid salt or a diphosphinic acid salt is preferable because of being excellent in the mixing property with the semiaromatic polyamide (A) and capable of effectively imparting flame retardancy by a small addition amount. Moreover, a mixture of a phosphinic acid salt and a diphosphinic acid salt is particularly preferable. Examples of the combination of a phosphinic acid salt and a diphosphinic acid salt include the combinations between a phosphinic acid salt such as aluminum diethylphosphinate or zinc diethylphosphinate and a diphosphinic acid salt such as aluminum methane-di(methylphosphinate) or zinc methane-di(methylphosphinate). Specific examples of the commercial products of the mixture between a phosphinic acid salt and a diphosphinic acid salt include the following products manufactured by Clariant GmbH: "Exolit OP1230," "Exolit OP1240," "Exolit OP1312" and "Exolit OP1314."

The phosphorus-based flame retardant (B) may be used in combination with a flame retardant aid. Examples of the flame retardant aid include a nitrogen-based flame retardant, a nitrogen-phosphorus-based flame retardant and an inorganic flame retardant; among these, a nitrogen-based flame retardant is preferable.

Examples of the nitrogen-based flame retardant include a melamine-based compound, and a salt between cyanuric acid or isocyanuric acid and a melamine compound. Specific examples of the melamine-based compound include: melamine, melamine derivatives, compounds having structure similar to melamine, and condensation products of melamine. More specific examples of the melamine-based compound may include: compounds having triazine skeleton such as melamine, ammelide, ammeline, formoguanamine, guanyl melamine, cyanomelamine, benzoguanamine, acetoguanamine, succinoguanamine, melam, melem, meton and melon; sulfuric acid salts of these; and melamine resins. The salt between cyanuric acid or isocyanuric acid and a melamine compound means an equimolar product composed of one of cyanuric acids or one of isocyanuric acids and a melamine-based compound.

Examples of the nitrogen-phosphorus-based flame retardant include: adducts (melamine adducts) formed from melamine or a condensation product thereof and a phosphorus compound, and phosphazene compounds.

Examples of the phosphorus compound constituting the melamine adduct include: phosphoric acid, orthophosphoric acid, phosphonic acid, phosphinic acid, metaphosphoric acid, pyrophosphoric acid, triphosphoric acid, tetraphosphoric acid and polyphosphoric acid. Specific examples of the melamine adduct include: melamine phosphate, melamine pyrophosphate, dimelamine pyrophosphate, melamine polyphosphate, melempolyphosphate and melampolyphosphate; among these, melamine polyphosphate is preferable. The number of phosphorus atoms is preferably 2 or more and more preferably 10 or more.

Examples of the phosphazene compound include a cyclic phosphazene compound represented by the following general formula (III):

[Formula 3]

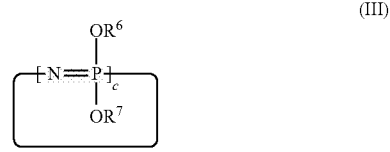

In the formula, $R^6$ and $R^7$ are each independently an alkyl group having 1 to 10 carbon atoms, an aryl group having 6 to 15 carbon atoms, and c represents an integer of 3 to 15. Examples of the alkyl group having 1 to 10 carbon atoms include: a methyl group, an ethyl group, an n-propyl group, an isopropyl group, various butyl groups, various hexyl groups, various octyl groups, a cyclopentyl group and a cyclohexyl group; any of a linear form, a branched form and a cyclic form may be adopted. Examples of the aryl group having 6 to 15 carbon atoms include: phenyl groups optionally substituted on the ring with the substituents such as an alkyl group(s), an aryl group(s) and an alkoxy group(s). $R^6$ and $R^7$ are both preferably aryl groups, and in particular, $R^6$ and $R^7$ are both preferably phenyl groups. Specific examples of the trade names of the phosphazene compounds include: "Rabitle PP-100" and "Rabitle FP-110" manufactured by Fushimi Pharmaceutical Co., Ltd.; and "SPS-100" and "SPB-100" manufactured by Otsuka Chemical Co., Ltd.

Examples of the inorganic flame retardant include: metal hydroxides such as magnesium hydroxide and calcium hydroxide; zinc salts such as zinc borate and zinc phosphate; and calcium aluminate. Among others, mixtures composed of zinc borate and zinc salt(s) other than zinc borate are preferable, and additionally, a mixture composed of magnesium hydroxide, zinc borate and zinc phosphate is preferable.

The metal hydroxide may have any of a granular form, a plate-like form and a needle-like form. When a granular or plate-like metal hydroxide is used, the average particle size thereof is preferably 0.05 to 10 μm and more preferably 0.1 to 5 m. When a needle-like metal hydroxide is used, the average diameter thereof is preferably 0.01 to 10 μm and more preferably 0.1 to 5 m, and the average length thereof is preferably 5 to 2000 m and more preferably 10 to 1000 μm.

The metal hydroxide is preferably small in the contents of the impurities such as other metals, chlorine and sulfur, from the viewpoint of heat resistance.

The surface of the metal hydroxide is preferably subjected to a surface treatment with a surface treatment agent or a solid solution because such a surface treatment can increase the dispersibility of the metal hydroxide in the semiaromatic polyamide resin composition and can improve the heat stability of the resin composition. Examples of the surface treatment agent includes a silane coupling agent, a titanium coupling agent, and fatty acids and the derivatives thereof. Examples of the solid solution include metals such as nickel.

Examples of zinc borate include $2ZnO \cdot 3B_2O_3$, $4ZnO \cdot B_2O_3 \cdot H_2O$, $2ZnO*3B_2O_3 \cdot 3.5H_2O$.

Examples of zinc salts other than zinc borate include: zinc phosphates such as $Zn_3(PO_4)_2 \cdot ZnO$; zinc stannates such as $ZnSn(OH)_6$ and $ZnSnO_3$; and additionally, calcium zinc molybdate; among these, zinc phosphate is preferable.

When zinc borate and zinc phosphate are used in combination, the mass ratio between zinc borate and zinc phosphate is preferably 1:0.1 to 1:5, more preferably 1:2 to 1:4 and furthermore preferably 1:2.5 to 1:3.5.

In the semiaromatic polyamide resin composition of the present invention, the phosphorus-based flame retardants (B) or the flame retardant aids may be used each alone or in combinations thereof.

Examples of the inorganic aluminum compound (C) used in the present invention include: alumina (aluminum oxide), transition alumina, boehmite (aluminum oxide•monohydrate), aluminum silicate and aluminum hydroxide; among these, boehmite and aluminum silicate are preferable, and boehmite is more preferable. The lower the crystallinity of boehmite, the more boehmite can stabilize the phosphorus-based flame retardant (B); even the addition of a small amount of such boehmite can reduce the amount of generated gas and can suppress the metal corrosion. The crystallinity of boehmite can be evaluated by an X-ray diffraction method; the X-ray peak height allows the crystallinity to be estimated. Boehmite acts on the included flame retardant and can improve the flame retardancy, and hence has an effect to reduce the content of the flame retardant.

The content of the inorganic aluminum compound (C) is required to be 0.1 to 20 parts by mass, and is preferably 0.2 to 10 parts by mass and more preferably 0.5 to 5 parts by mass, in relation to 100 parts by mass of the total amount of the semiaromatic polyamide (A) and the phosphorus-based flame retardant (B). When the content of the inorganic aluminum compound (C) is less than 0.1 part by mass, the generated gas amount reduction effect or the metal corrosion suppression effect is not obtained. On the other hand, when the content of the inorganic aluminum compound (C) exceeds 20 parts by mass, the resin composition is excellent in the generated gas amount reduction effect and the metal corrosion suppression effect, but the resulting molded body is insufficient in mechanical properties.

In the present invention, the inclusion of the inorganic aluminum compound (C) reduces the amount of generated gas derived from the phosphorus-based flame retardant (B). Accordingly, the amount of generated gas can be suppressed at the temperature during molding processing, the workability is improved, the clogging of the die gas vent opening hardly occurs, and the contamination of the die hardly occurs.

In the present invention, the amount of generated gas derived from the phosphorus-based flame retardant (B) can be reduced, and accordingly, the metal corrosion at high temperatures can be suppressed. Consequently, the abrasion of the screw and die of an extruder during extrusion processing, and the abrasion of the metal components such as the screw and die of a molding machine during molding processing can be reduced.

In the present invention, the amount of generated gas can be reduced, and hence the mold release property during the molding can also be improved. Accordingly, molding can be continuously performed over a long period of time, without causing molding failure.

In the present invention, the use of a monocarboxylic acid of the semiaromatic polyamide (A), having a molecular weight of 140 or more can further reduce the amount of generated gas derived from the semiaromatic polyamide (A). In this case, the effect to reduce the amount of generated gas derived from the semiaromatic polyamide (A) and the effect to reduce the amount of generated gas derived from the phosphorus-based flame retardant (B) synergistically work, and consequently the amount of generated gas is drastically reduced at the temperature during molding processing.

The semiaromatic polyamide resin composition of the present invention preferably further include the fibrous reinforcing material (D). Examples of the fibrous reinforcing material (D) include, without being particularly limited to: glass fiber, carbon fiber, boron fiber, asbestos fiber, polyvinyl alcohol fiber, polyester fiber, acrylic fiber, wholly aromatic polyamide fiber, polybenzoxazole fiber, polytetrafluoroethylene fiber, kenaf fiber, bamboo fiber, hemp fiber, bagasse fiber, high strength polyethylene fiber, alumina fiber, silicon carbide fiber, potassium titanate fiber, brass fiber, stainless steel fiber, steel fiber, ceramic fiber and basalt fiber. Among these, glass fiber, carbon fiber and metal fiber are preferable because of being high in the improvement effect of mechanical properties, having heat resistance capable of withstanding the heating temperature during melt kneading with the polyamide resin, and being easily available. The fibrous reinforcing materials (D) may be used each alone or in combinations thereof.

Glass fiber and carbon fiber are preferably surface treated with a silane coupling agent. The silane coupling agent may be dispersed in a sizing agent. Examples of the silane coupling agent include vinylsilane-based coupling agents, acrylic silane-based coupling agents, epoxysilane-based coupling agents and aminosilane-based coupling agents; among these, aminosilane-based coupling agents are preferable because of being high in the adhesion effect between the semiaromatic polyamide (A) and glass fiber or carbon fiber.

The fiber length and the fiber diameter of the fibrous reinforcing material (D) are not particularly limited; however, the fiber length is preferably 0.1 to 7 mm and more preferably 0.5 to 6 mm. The fiber length of the fibrous reinforcing material (D) falling within the range from 0.1 to 7 mm allows the resin composition to be reinforced without adversely affecting the moldability. The fiber diameter is preferably 3 to 20 m and more preferably 5 to 13 pun. The fiber diameter falling within the range from 3 to 20 μm allows the resin composition to be reinforced without causing fiber breakage during melt kneading.

Examples of the cross-sectional shape of the fibrous reinforcing material (D) include a circle, a rectangle, an ellipse, and other non-circular cross-sections; among these, a circle is preferable.

When the fibrous reinforcing material (D) is used, the content of the fibrous reinforcing material (D) is preferably 5 to 200 parts by mass, more preferably 10 to 180 parts by mass, furthermore preferably 20 to 150 parts by mass and particularly preferably 30 to 130 parts by mass, in relation to 100 parts by mass of the total amount of the semiaromatic polyamide (A) and the phosphorus-based flame retardant (B). When the content of the fibrous reinforcing material (D) is less than 5 parts by mass, the improvement effect of mechanical properties is sometimes small. On the other hand, when the content of the fibrous reinforcing material (D) exceeds 200 parts by mass, the improvement effect of mechanical properties is saturated and no further improvement effect can be expected, moreover the workability during melt kneading is degraded, and it is sometimes difficult to obtain the pellet of the semiaromatic polyamide resin composition.

The semiaromatic polyamide resin composition of the present invention can be made to be further excellent in stability and moldability, by including a phosphorus-based antioxidant.

The phosphorus-based antioxidant may be either an inorganic compound or an organic compound. Examples of the phosphorus-based antioxidant include: inorganic phosphoric acid salts such as monosodium phosphate, disodium phosphate, trisodium phosphate, sodium phosphite, calcium phosphite, magnesium phosphite and manganese phosphite; and organic phosphorus compounds such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite ("Adeka Stab PEP-36"), bis(2,4-di-tert-butylphenyl)pentaerythritol diphosphite ("Adeka Stab PEP-24G"), tris(2,4-di-tert-butylphenyl)phosphite, distearylpentaerythritol diphosphite ("Adeka Stab PEP-8"), bis(nonylphenyl)pentaerythritol diphosphite ("Adeka Stab PEP-4C"), 1,1'-biphenyl-4,4'-diyl bis[bis(2,4-di-tert-butylphenyl) phosphite], tetrakis(2,4-di-tert-butylphenyl)4,4'-biphenylene-di-phosphonite ("Hostanox P-EPQ"), tetra(tridecyl-4,4'-isopropylidene diphenyl diphosphite and 2,2-methylene bis (4,6-di-tert-butylphenyl)octyl phosphite. The phosphorus-based antioxidants may be used each alone or in combinations thereof.

The phosphorus-based antioxidant tends to be uniformly mixed with the phosphorus-based flame retardant (B) in the present invention and prevents the decomposition of the flame retardant, and consequently can improve the flame retardancy. The phosphorus-based antioxidant can also prevent the decrease of the molecular weight of the semiaromatic polyamide (A) and can improve the operability, moldability and mechanical properties during melt processing. In particular, the phosphorus-based antioxidant can exhibit remarkable effects on the mold release property during molding and on the reduction of the amount of generated gas at the temperature during molding processing.

The content of the phosphorus-based antioxidant is preferably 0.1 to 3 parts by mass and more preferably 0.1 to 1 part by mass, in relation to 100 parts by mass of the total amount of the semiaromatic polyamide (A) and the phosphorus-based flame retardant (B). The content of the phosphorus-based antioxidant set to fall within a range from 0.1 to 3 parts by mass can improve the mold release property from the die during molding, suppress the clogging of the die gas vent opening and improve the continuous injection moldability, without degrading the stability, moldability and mechanical properties during extrusion processing.

To the semiaromatic polyamide resin composition of the present invention, if necessary, other additives such as a filler, a stabilizer, a colorant, an antistatic agent and a carbonation suppressing agent may be further added. Examples of the filler include talc, swelling clay minerals, silica, alumina, glass beads and graphite. Examples of the colorant include: pigments such as titanium oxide and carbon black; and dyes such as nigrosine. Examples of the stabilizer include a hindered phenol-based antioxidant, a sulfur-based antioxidant, a light stabilizer, a heat stabilizer composed of a copper compound and a heat stabilizer composed of alcohols. The carbonation suppressing agent is an additive to improve the tracking resistance; examples of the carbonation suppressing agent include inorganic substances such as metal hydroxides and metal borates, and above-described heat stabilizers. In the present invention, the method for producing the resin composition of the present invention by mixing the semiaromatic polyamide (A), the phosphorus-based flame retardant (B), the inorganic aluminum compound (C), and the fibrous reinforcing material (D) and the additives added if necessary is not particularly limited as long as the advantageous effects of the resin composition are not impaired; a melt kneading method is more preferable as the production method concerned. Examples of the melt kneading method include the methods using a batch type kneader such as a Brabender, a Banbury mixer, a Henschel mixer, a helical rotor, a roll, a single screw extruder and a twin screw extruder. The melt kneading temperature is selected from the region in which the semiaromatic polyamide (A) is melted, but not decomposed. When the melt kneading temperature is too high, not only the semiaromatic polyamide (A) is decomposed, but also the phosphorus-based flame retardant (B) may be decomposed; accordingly, with Tm representing the melting point of the semiaromatic polyamide (A), the melt kneading temperature is preferably (Tm−20° C.) to (Tm+50° C.).

Examples of the method for processing the resin composition of the present invention into various shapes include: a method in which a molten mixture is extruded into a strand shape and processed into a pellet shape; a method in which a molten mixture is hot cut or cut under water into a pellet shape; a method in which a molten mixture is extruded into a sheet-like shape and subjected to cutting; and a method in which a molten mixture is extruded into a block-like shape and pulverized into a powder form.

Examples of the method for molding the semiaromatic polyamide resin composition of the present invention include an injection molding method, an extrusion molding method, a blow molding method, and a sinter molding method; among these, the injection molding method is preferable because of resulting in significant improvement effects of the mechanical properties and moldability.

Examples of the injection molding machine include, without being particularly limited to: a screw in-line type injection molding machine and a plunger type injection molding machine. The semiaromatic polyamide resin composition heat-melted in the cylinder of an injection molding machine is metered every shot, injected into a die in a molten state, cooled and solidified in a predetermined shape, and then taken out as a molded body from the die. The resin temperature during injection molding is such that the resin composition is preferably heat-melted at a temperature equal to or higher than the melting point (Tm) of the semiaromatic polyamide (A), and is more preferably set to be lower than (Tm+50° C.).

When the semiaromatic polyamide resin composition is heat-melted, it is preferable to use a sufficiently dried semiaromatic polyamide resin composition pellet. When the water content is large, the resin undergoes foaming in the cylinder of the injection molding machine, and accordingly sometimes it is difficult to obtain an optimal molded body. The water content of the semiaromatic polyamide resin composition pellet used for injection molding is preferably less than 0.3 part by mass and more preferably less than 0.1 part by mass, in relation to 100 parts by mass of the semiaromatic polyamide resin composition.

The semiaromatic polyamide resin composition of the present invention is excellent in mold release property as well as in mechanical properties, heat resistance and flame retardancy, is suppressed in the metal corrosion at high temperatures, and is small in the amount of generated gas at the temperature during molding processing, and hence can be used as molded bodies in wide ranges of applications such as applications to vehicle components, electric and electronic components, miscellaneous goods and civil engineering and construction components.

Examples of the vehicle components include: thermostat covers, IGBT module components of inverters, insulator members, exhaust finishers, power device enclosures, ECU enclosures, ECU connectors, electrical insulating materials for motors and coils, and coating materials for cables. Examples of the electric and electronic components include:

connectors, LED reflectors, switches, sensors, sockets, capacitors, jacks, fuse holders, relays, coil bobbins, breakers, electromagnetic switches, holders, plugs, enclosure components for electrical devices such as portable personal computers and word processors, resistors, ICs and LED housings. The semiaromatic polyamide resin composition of the present invention is excellent particularly in flame retardancy, and accordingly can be suitably used for electric and electronic components among the above-listed components and others.

EXAMPLES

Hereinafter, the present invention is described specifically by way of Examples, but the present invention is not limited by these Examples.

1. Measurement Methods

The measurements of the physical properties of the semiaromatic polyamide and the semiaromatic polyamide resin composition were performed by the following methods.

(1) Relative Viscosity

The relative viscosity was measured by using 96% sulfuric acid as a solvent at a concentration of 1 g/dL, at 25° C.

(2) Melting Point

By using the differential scanning calorimeter DSC-7 (manufactured by Perkin-Elmer Corp.), a sample was increased in temperature to 350° C. at a temperature increase rate of 20° C./min, then the sample was maintained at 350° C. for 5 minutes, decreased in temperature to 25° C. at a temperature decrease rate of 20° C./min, further maintained at 25° C. for 5 minutes, and then again increased in temperature at a temperature increase rate of 20° C./min, as the second temperature increase measurement, namely, the second scan; the temperature at the top of the endothermic peak in the second scan was taken as the melting point (Tm).

(3) Melt Flow Rate (MFR)

The melt flow rate was measured according to JIS K7210, at 330° C., under a load of 1.2 kgf.

MFR can be adopted as the index of the mold fluidity; the higher MFR value means the higher fluidity.

(4) Mechanical Properties

The semiaromatic polyamide resin composition was injection molded by using the injection molding machine Model S2000i-100B (manufactured by Fanuc Corp.) under the conditions of a cylinder temperature (melting point+15° C.) and a die temperature (melting point−185° C.) to prepare a specimen (dumbbell piece).

By using the obtained specimen, the flexural strength and the flexural modulus of elasticity were measured according to ISO178.

The larger numerical value of the flexural strength and the larger numerical value of the flexural modulus of elasticity mean that the mechanical properties are excellent.

(5) Flame Retardancy

The semiaromatic polyamide resin composition was injection molded by using the injection molding machine CND15 (manufactured by Niigata Machine Techno Co., Ltd.) under the conditions of a cylinder temperature (melting point+15° C.) and a die temperature (melting point−185° C.), to prepare a 5 inches (127 mm)×½ inch (12.7 mm)×1/32 inch (0.79 mm) specimen.

By using the obtained specimen, the flame retardancy was evaluated according to the standard of UL94 (the standard specified by Under Writers Laboratories Inc., U.S.) shown in Table 1. The case where the flame retardancy did not meet any standard was marked with "not V-2."

The shorter total afterflame time means that the flame retardancy is excellent.

TABLE 1

| Evaluation | V-0 | V-1 | V2 |
|---|---|---|---|
| First afterflame time | 10 seconds or less | 30 seconds or less | 30 seconds or less |
| Sum of 10 afterflame times for 5 specimens | 50 seconds or less | 250 seconds or less | 250 seconds or less |
| Occurrence/non-occurrence of ignition of cotton by drips | Not occurred | Not occurred | Occurred |
| Burnout of sample | Not occurred | Not occurred | Not occurred |

(6) Amount of Generated Gas

By using 5 mg of the semiaromatic polyamide resin composition as a sample, the volatile component generated by heating the sample by using a pyrolyzer was measured with a gas chromatograph mass analyzer. By data-base searching, the chemical structures corresponding to the individual peaks were identified, and then the peaks were identified whether or not the peaks were derived from the semiaromatic polyamide, the flame retardant or the substances other than these. The following standard samples were measured by the same method, and the amounts of generated gas of the individual peaks were quantitatively determined on the basis of the relations between the peak area values and the substance amounts. Then, the amount of generated gas (mg/g) derived from the semiaromatic polyamide and the amount of generated gas (mg/g) derived from the phosphorus-based flame retardant in relation to the mass (g) of the semiaromatic polyamide resin composition were determined.

<Pyrolyzer Conditions>
Apparatus: PY-2020iD (manufactured by Frontier-Labo., Ltd.)
Heating: 320° C., 10 minutes
<Gas Chromatograph Conditions>
Apparatus: 6890N (manufactured by Agilent Technologies, Inc.)
Column: UA5 (MS/HT) 30M-0.25F (manufactured by Frontier-Labo., Ltd.), 0.25 mm in inner diameter×30 m in length, film thickness: 0.25 μm
Carrier gas: helium, 1.0 ml/min
Injection port: 250° C., split ratio: 30:1
Temperature: 50° C. (2 minutes)→[20° C./min]→170°) C (0 min)→[50° C./min]→350° C. (8 min)
<Mass Analyzer Conditions>
Apparatus: 5975C (manufactured by Agilent Technologies, Inc.)
Mass range: m/z=5 to 650
<Standard Sample>
n-Hexadecane/hexane solution (100 ppm), 5 μl
<Database>
NIST Mass Spectral Library Revision 2005 D.05.01 (compiled by Agilent Technologies, Inc.)
EGA-MS10B library (compiled by Frontier-Labo., Ltd.)
PyGC-MS10B library (compiled by Frontier-Labo., Ltd.)
ADD-MS08B library (compiled by Frontier-Labo., Ltd.)
Pyrolyzate-MS09B library (compiled by Frontier-Labo., Ltd.)

(7) Die Contamination

By using the injection molding machine α-100iA (manufactured by Fanuc Corp.), a shallow cup-shaped (thickness: 1.5 mm, outer diameter: 40 mm, depth: 30 mm) molded body was molded with a cycle of 25 seconds at consecutive 500 shots, under the conditions of a cylinder temperature (melting point+25° C.) and a die temperature (melting point−185° C.). After the completion of the molding, the gas vent of 4 μm in depth and 1 mm in width was visually examined, and the die contamination was evaluated on the basis of the following standards. E (Excellent) and G (Good) were evaluated to be acceptable.

E (Excellent): Clogging was not found at all.
G (Good): Clogging was partially found.
P (Poor): Perfect clogging was found.

(8) Mold Release Property

The mold release property was evaluated by visually observing the occurrence/non-occurrence of the ejection pin trace in the molded bodies at the 401-th to 500-th shots in the consecutive molding in the above-described (7), and by counting the number of the molded bodies free from the pin trace.

The number of the molded bodies free from the pin trace is preferably 90 or more and more preferably 95 or more.

(9) Metal Corrosion

As shown in FIG. 1, a die (D) is fixed to a twin screw kneading extruder (EX) (PCM30, manufactured by Ikegai Corp.), the metal plates (MP) (material: SUS630, 20×10 mm, thickness: 5 mm, mass: 7.8 g) usually used as the steel members of the extruder were disposed above and below the flow path (R) of the molten resin so as to form a gap of 1 mm therebetween, and the molten resin was allowed to be brought into contact with the metal plate over a width of 10 mm and a length of 20 mm. Into the gap, a total amount of 25 kg of the semiaromatic polyamide resin composition was extruded under the conditions of the extruder barrel temperature set at 320° C. and the discharge rate set at 7 kg/h. After completion of the extrusion, the metal plates (MP) were disassembled and allowed to stand in a furnace set at 500° C. for 10 hours, the attached resin was removed from the metal plates, the mass of the metal plates was measured, and the metal corrosion was measured from the mass variation between before and after the extrusion.

The case where the weight reduction rate of the metal plates (MP) between before and after the extrusion was 0.20% or less was evaluated to be acceptable.

2. Raw Materials

The raw materials used in Examples and Comparative Examples are shown below.

(1) Semiaromatic Polyamides
Semiaromatic Polyamide (A-1)

In a ribbon blender-type reaction apparatus, 4.70 kg of terephthalic acid (TPA) in a power form as the aromatic dicarboxylic acid component, 0.32 kg of stearic acid (STA) as the monocarboxylic acid component and 9.3 g of sodium hypophosphite monohydrate as the polymerization catalyst were placed, and were heated to 170° C. while the resulting mixture was being stirred at a number of rotations of 30 rpm under sealing with nitrogen. Subsequently, while the temperature was being maintained at 170° C. and the number of rotations was being maintained at 30 rpm, by using a liquid injection apparatus, 4.98 kg of 1,10-decanediamine (DDA) heated to 100° C. was added to the above-described mixture as the aliphatic diamine component, continuously (continuous liquid injection method) over 2.5 hours, and thus a product was obtained. The molar ratio between the raw material monomers was TPA:DDA:STA=48.5:49.6:1.9 (the equivalent ratio between the functional groups of the raw material monomers was TPA:DDA:STA=49.0:50.0:1.0).

Successively, the obtained product was heated in the same reaction apparatus to be polymerized in a flow of nitrogen gas at 250° C. for 8 hours, at a number of rotations of 30 rpm, and thus, a powder of a semiaromatic polyamide was prepared.

Subsequently, the obtained powder of the semiaromatic polyamide was converted into a strand shape by using a twin screw kneading machine, the strand was made to pass through a water tank to be solidified, and the solidified strand was cut into a pellet with a pelletizer to yield a semiaromatic polyamide (A-1) pellet.

Semiaromatic Polyamides (A-2) to (A-12)

The semiaromatic polyamides (A-2) to (A-12) were obtained in the same manner as in the case of the semiaromatic polyamide (A-1) except that the resin compositions were altered as shown in Table 2.

Table 2 shows the resin compositions and the values of the properties of the obtained semiaromatic polyamides.

TABLE 2

| | | Composition of semiarotnatic polyamide (A) | | | | | | Values of properties | |
| --- | --- | --- | --- | --- | --- | --- | --- | --- | --- |
| | | Aromatic dicarboxylic acid component | | Aliphatic diamine component | | Monocarboxylic acid component | | | Melting point ° C. | Melt flow |
| | | Type | Content mol % | Type | Content mol % | Type | Molecular weight | Content mol % | | Relative viscosity | rate g/10 min |
| Semiaromatic polyamides | A-1 | TPA | 48.5 | DDA | 49.6 | STA | 284 | 1.9 | 317 | 2.25 | 75 |
| | A-2 | TPA | 49.3 | DDA | 50.4 | STA | 284 | 0.3 | 317 | 3.50 | 7 |
| | A-3 | TPA | 49.1 | DDA | 50.0 | STA | 284 | 0.9 | 317 | 2.71 | 43 |
| | A-4 | TPA | 48.5 | NDA | 49.7 | STA | 284 | 1.8 | 310 | 2.31 | 70 |
| | A-5 | TPA | 46.8 | DDA | 49.2 | STA | 284 | 4.0 | 306 | 1.80 | 200 |
| | A-6 | TPA | 48.5 | DDA | 49.6 | BA | 122 | 1.9 | 317 | 2.24 | 58 |
| | A-7 | TPA | 48.5 | DDA | 49.6 | CP | 144 | 1.9 | 316 | 2.24 | 65 |
| | A-8 | TPA | 48.5 | DDA | 49.6 | LA | 200 | 1.9 | 316 | 2.27 | 71 |
| | A-9 | TPA | 48.5 | DDA | 49.6 | LBA | 290 | 1.9 | 316 | 2.26 | 65 |
| | A-10 | TPA | 48.5 | DDA | 49.6 | BHA | 341 | 1.9 | 315 | 2.25 | 67 |
| | A-11 | TPA | 49.30 | DDA | 50.45 | STA | 284 | 0.25 | 315 | 3.74 | 5 |
| | A-12 | TPA | 46.0 | DDA | 49.2 | STA | 284 | 4.8 | 315 | 1.58 | 134 |

TPA: Terephthalic acid, DDA: 1,10-Decanediamine, NDA: 1,9-Nonanediamine,
STA: Stearic acid, BA: Benzoic acid, CP: Captylic acid, LA: Laurie acid, LBA 4-Laurrylbetizeic acid, BHA: Belienie acid (2) Phosphorus-Based Flame Retardants
B-1: Mixture of phosphinic acid salt and diphosphinic acid salt (Exolit OP1230, manufactured by Clariant GmbH)
B-2: 1,3-Phenylene-tetrakis(2,6-dimethylphenyl)phosphoric acid ester (PX-200, manufactured by Daihachi Chemical Industry Co., Ltd.)
B-3: Ethyl methyl phosphinic acid aluminum salt
In 6.5 L of water, 2106 g (19.5 moles) of ethylmethylphosphinic acid was dissolved and heated to 85° C., and while the resulting mixture was being vigorously stirred, 507 g (6.5 moles) of aluminum hydroxide was added to and mixed with the mixture. The mixture was stirred at 80 to 90° C. for 65 hours, then cooled to 60° C., and filtered under suction. The residue was dried in a vacuum dryer at 120° C. to a constant weight to yield 2140 g of ethylmethylphosphinic acid aluminum salt in a form of a fine particle powder not having melting points of 300° C. or lower. The yield was 95%.
(3) Inorganic Aluminum Compounds
C-1: Low-crystallinity boehmite (Tomita AD-220T, manufactured by Tomita Pharmaceutical Co., Ltd.)
C-2: High-crystallinity boehmite (C20, manufactured by Taimei Chemicals Co., Ltd.)
C-3: Aluminum silicate (Tomita AD700P, manufactured by Tomita Pharmaceutical Co., Ltd.)
C-4: Transition alumina (AA101, manufactured by Nippon Light Metal Co., Ltd.)
(4) Reinforcing Materials
D-1: Glass fiber (03JAFT692, manufactured by Asahi Fiber Glass Co., Ltd.), average fiber diameter: 10 μm, average fiber length: 3 mm
D-2: Carbon fiber (HTA-C6-NR, manufactured by Toho Tenax Co., Ltd.), average fiber diameter: 7 μm, average fiber length: 6 mm
D-3: Stainless steel fiber (Naslon SUS304, manufactured by Nippon Seisen Co., Ltd.), average fiber diameter: 8 μm, average fiber length: 6 mm
D-4: Talc (Micro Ace K-1, manufactured by Nippon Talc Co., Ltd.), average particle size: 8 μm
(5) Flame Retardant Aids
E-1: Melamine polyphosphate (Melapur 200/70, manufactured by BASF Ltd.)
E-2: Zinc borate $4ZnO.B_2O_3.H_2O$ (Firebrake 415, manufactured by Borax Inc.)
E-3: Cyclic phosphazene (Rabitle FP-100, manufactured by Fushimi Pharmaceutical Co., Ltd.)
(6) Phosphorus-Based Antioxidant
F-1: Tetrakis(2,4-di-tert-butylphenyl)4,4'-biphenylene-diphosphonite (Hostanox P-EPQ, manufactured by Clariant GmbH)

Example 1

A mixture was prepared by dry blending 75 parts by mass of the semiaromatic polyamide (A-1), 25 parts by mass of the phosphorus-based flame retardant (B-1), 1 part by mass of the inorganic aluminum compound (C-1), 2 parts by mass of the flame retardant aid (E-1), 2 parts by mass of the flame retardant aid (E-2) and 0.3 part by mass of the phosphorus-based antioxidant (F-1); the resulting mixture was metered by using the loss-in-weight type continuous metering feeder CE-W-1 (manufactured by Kubota Corp.) and was fed for melt kneading to the main feeding port of the same direction twin screw extruder TEM26SS (manufactured by Toshiba Machine Co., Ltd.) having a screw diameter of 26 mm with L/D50. On the way, from the side feeder, 45 parts by mass of the fibrous reinforcing material (D-1) was fed and the resulting mixture was further kneaded. The kneaded mixture was taken out form the die into a strand shape, and then allowed to pass through a water tank to be cooled and solidified; the solidified product was cut with a pelletizer to yield a semi-aromatic polyamide resin composition pellet. The barrel temperature of the extruder was set at 310 to 330° C., the screw rotation number was set at 250 rpm, and the discharge rate was set at 25 kg/h.

Examples 2 to 38 and Comparative Examples 1 to 8

In each of Examples 2 to 38 and Comparative Examples 1 to 8, a semiaromatic polyamide resin composition pellet was obtained by performing the same operations as in Example 1 except that the composition of the semiaromatic polyamide resin composition was altered as shown in Table 3 or Table 4.

By using the obtained semiaromatic polyamide resin composition pellets, the various evaluation tests were performed. The results thus obtained are shown in Tables 3 and 4.

TABLE 3

| | | Composition of semiaromatic polyamide resin composition (parts by mass) | | | | | | | | | | |
|---|---|---|---|---|---|---|---|---|---|---|---|---|
| | | Semiatomatic polyamide (A) | | Phosphorus-based flame retardant (B) | | Inorganic aluminum compound (C) | | Fibrous reinforcing material (D) | | Flame retardant aid | | | Phosphorus-based antioxidant |
| | | Type | parts | Type | parts | Type | F-1 | Type | parts | E-1 | E-2 | E-3 | F-1 |
| Examples | 1 | A-1 | 75 | B-1 | 25 | C-1 | 1 | D-1 | 45 | 2 | 2 | — | 0.3 |
| | 2 | A-2 | 75 | B-1 | 25 | C-1 | 1 | D-1 | 45 | 2 | 2 | — | 0.3 |
| | 3 | A-3 | 75 | B-1 | 25 | C-1 | 1 | D-1 | 45 | 2 | 2 | — | 0.3 |
| | 4 | A-4 | 75 | B-1 | 25 | C-1 | 1 | D-1 | 45 | 2 | 2 | — | 0.3 |
| | 5 | A-5 | 75 | B-1 | 25 | C-1 | 1 | D-1 | 45 | 2 | 2 | — | 0.3 |
| | 6 | A-6 | 75 | B-1 | 25 | C-1 | 1 | D-1 | 45 | 2 | 2 | — | 0.3 |
| | 7 | A-7 | 75 | B-1 | 25 | C-1 | 1 | D-1 | 45 | 2 | 2 | — | 0.3 |
| | 8 | A-8 | 75 | B-1 | 25 | C-1 | 1 | D-1 | 45 | 2 | 2 | — | 0.3 |
| | 9 | A-9 | 75 | B-1 | 25 | C-1 | 1 | D-1 | 45 | 2 | 2 | — | 0.3 |
| | 10 | A-10 | 75 | B-1 | 25 | C-1 | 1 | D-1 | 45 | 2 | 2 | — | 0.3 |
| | 11 | A-1 | 95 | B-1 | 5 | C-1 | 1 | D-1 | 45 | 2 | 2 | — | 0.3 |
| | 12 | A-1 | 92 | B-1 | 8 | C-1 | 1 | D-1 | 45 | 2 | 2 | — | 0.3 |
| | 13 | A-1 | 60 | B-1 | 40 | C-1 | 1 | D-1 | 45 | 2 | 2 | — | 0.3 |
| | 14 | A-1 | 50 | B-1 | 50 | C-1 | 1 | D-1 | 45 | 2 | 2 | — | 0.3 |

TABLE 3-continued

| | | | | | | | | | | | | | |
|---|---|---|---|---|---|---|---|---|---|---|---|---|---|
| | 15 | A-1 | 75 | B-2 | 25 | C-1 | 1 | D-1 | 45 | 2 | 2 | — | 0.3 |
| | 16 | A-1 | 75 | B-3 | 25 | C-1 | 1 | D-1 | 45 | 2 | 2 | — | 0.3 |
| | 17 | A-1 | 75 | B-1 | 25 | C-1 | 0.1 | D-1 | 45 | 2 | 2 | — | 0.3 |
| | 18 | A-1 | 75 | B-1 | 25 | C-1 | 0.3 | D-1 | 45 | 2 | 2 | — | 0.3 |
| | 19 | A-1 | 75 | B-1 | 25 | C-1 | 8 | D-1 | 45 | 2 | 2 | — | 0.3 |
| | 20 | A-1 | 75 | B-1 | 25 | C-1 | 20 | D-1 | 45 | 2 | 2 | — | 0.3 |
| | 21 | A-1 | 75 | B-1 | 25 | C-2 | 1 | D-1 | 45 | 2 | 2 | — | 0.3 |
| | 22 | A-1 | 75 | B-1 | 25 | C-3 | 1 | D-1 | 45 | 2 | 2 | — | 0.3 |
| | 23 | A-1 | 75 | B-1 | 25 | C-4 | 1 | D-1 | 45 | 2 | 2 | — | 0.3 |
| | 24 | A-1 | 75 | B-1 | 25 | C-1/C-3 | 1/1 | D-1 | 45 | 2 | 2 | — | 0.3 |
| | 25 | A-1 | 75 | B-1 | 25 | C-2/C-3 | 1/1 | D-1 | 45 | 2 | 2 | — | 0.3 |

| | | Properties | | | | | | | | | |
|---|---|---|---|---|---|---|---|---|---|---|---|
| | | Mechanical properties | | Melt Flow rate g/10 min | Flame retardancy | | Amount of generated gas (mg/g) | | Die contamination | Mold release property pieces | Metal corrosion % |
| | | Flexural strength MPa | Flexural modulus of elasticity GPa | | Evaluation | Total after-flame time sec | Total amount (exclusive of water content) | Component derived from polyamide | Component derived from phosphorus-based flame retardant | | |
| Examples | 1 | 225 | 10.4 | 20 | V-0 | 35 | 1.12 | 0.03 | 0.03 | E | 100 | 0.14 |
| | 2 | 262 | 13.8 | 3 | V-0 | 37 | 1.11 | 0.03 | 0.03 | E | 100 | 0.14 |
| | 3 | 241 | 12.0 | 10 | V-0 | 35 | 1.21 | 0.06 | 0.03 | E | 100 | 0.14 |
| | 4 | 215 | 10.3 | 18 | V-0 | 37 | 1.16 | 0.07 | 0.03 | E | 100 | 0.14 |
| | 5 | 196 | 8.9 | 34 | V-0 | 33 | 1.18 | 0.08 | 0.03 | E | 100 | 0.14 |
| | 6 | 218 | 10.1 | 14 | V-0 | 40 | 1.35 | 0.15 | 0.04 | G | 90 | 0.15 |
| | 7 | 221 | 10.1 | 15 | V-0 | 39 | 1.18 | 0.12 | 0.04 | E | 98 | 0.15 |
| | 8 | 222 | 10.1 | 18 | V-0 | 38 | 1.17 | 0.08 | 0.03 | E | 96 | 0.15 |
| | 9 | 217 | 10.0 | 16 | V-0 | 37 | 1.22 | 0.07 | 0.03 | G | 90 | 0.14 |
| | 10 | 224 | 10.2 | 18 | V-0 | 36 | 1.15 | 0.03 | 0.04 | E | 100 | 0.14 |
| | 11 | 240 | 11.6 | 16 | V-2 | 191 | 1.10 | 0.03 | 0.01 | E | 100 | 0.06 |
| | 12 | 234 | 10.7 | 17 | V-1 | 123 | 1.06 | 0.04 | 0.02 | E | 100 | 0.07 |
| | 13 | 195 | 8.5 | 31 | V-0 | 7 | 3.57 | 0.02 | 0.10 | E | 100 | 0.19 |
| | 14 | 181 | 8.0 | 39 | V-0 | 6 | 3.80 | 0.02 | 0.14 | E | 100 | 0.20 |
| | 15 | 202 | 8.6 | 43 | V-2 | 56 | 2.47 | 0.05 | 0.08 | E | 100 | 0.03 |
| | 16 | 227 | 10.2 | 17 | V-0 | 39 | 1.10 | 0.05 | 0.03 | E | 100 | 0.13 |
| | 17 | 225 | 10.5 | 21 | V-0 | 43 | 1.42 | 0.04 | 0.14 | E | 100 | 0.19 |
| | 18 | 221 | 10.1 | 21 | V-0 | 40 | 1.26 | 0.05 | 0.10 | E | 100 | 0.17 |
| | 19 | 235 | 10.8 | 15 | V-0 | 31 | 1.05 | 0.04 | 0.02 | E | 100 | 0.10 |
| | 20 | 183 | 8.6 | 12 | V-0 | 27 | 0.96 | 0.05 | 0.01 | E | 100 | 0.06 |
| | 21 | 214 | 10.3 | 18 | V-0 | 37 | 1.13 | 0.04 | 0.06 | E | 100 | 0.17 |
| | 22 | 219 | 10.5 | 22 | V-0 | 42 | 1.17 | 0.05 | 0.07 | E | 100 | 0.18 |
| | 23 | 217 | 10.1 | 17 | V-0 | 43 | 1.28 | 0.04 | 0.09 | E | 100 | 0.20 |
| | 24 | 229 | 10.8 | 22 | V-0 | 34 | 1.07 | 0.04 | 0.02 | E | 100 | 0.11 |
| | 25 | 225 | 10.4 | 17 | V-0 | 40 | 1.10 | 0.05 | 0.02 | E | 100 | 0.14 |

TABLE 4

| | | Composition of semiaromatic polyamide resin composition (parts by mass) | | | | | | | | | | | |
|---|---|---|---|---|---|---|---|---|---|---|---|---|---|
| | | Semiaromatic polyamide (A) | | Phosphorus-based flame retardant (B) | | Inorganic aluminum compound (C) | | Fibrous reinforcing material (D) | | Flame retardant aid | | | Phosphorus-based antioxidant |
| | | Type | parts | Type | parts | Type | parts | Type | parts | E-1 | E-2 | E-3 | F-1 |
| Examples | 26 | A-1 | 75 | B-1 | 25 | C-1 | 1 | — | — | 2 | 2 | — | 0.3 |
| | 27 | A-1 | 75 | B-1 | 25 | C-1 | 1 | D-1 | 100 | 2 | 2 | — | 0.3 |
| | 28 | A-1 | 75 | B-1 | 25 | C-1 | 1 | D-1 | 170 | 2 | 2 | — | 0.3 |
| | 29 | A-1 | 75 | B-1 | 25 | C-1 | 1 | D-2 | 45 | 2 | 2 | — | 0.3 |
| | 30 | A-1 | 75 | B-1 | 25 | C-1 | 1 | D-3 | 45 | 2 | 2 | — | 0.3 |
| | 31 | A-1 | 75 | B-1 | 25 | C-1 | 1 | D-4 | 45 | 2 | 2 | — | 0.3 |
| | 32 | A-1 | 75 | B-1 | 25 | C-1 | 1 | D-1 | 45 | — | — | — | 0.3 |
| | 33 | A-1 | 75 | B-1 | 25 | C-1 | 1 | D-1 | 45 | 2 | — | — | 0.3 |
| | 34 | A-1 | 75 | B-1 | 25 | C-1 | 1 | D-1 | 45 | — | 2 | — | 0.3 |
| | 35 | A-1 | 75 | B-1 | 25 | C-1 | 1 | D-1 | 45 | — | — | 8 | 0.3 |
| | 36 | A-1 | 75 | B-1 | 25 | C-1 | 1 | D-1 | 45 | 2 | 2 | 8 | 0.3 |
| | 37 | A-1 | 75 | B-1 | 25 | C-1 | 1 | D-1 | 45 | 2 | 2 | — | — |
| | 38 | A-1 | 75 | B-1 | 25 | C-1 | 1 | D-1 | 45 | 2 | 2 | — | 2 |

TABLE 4-continued

| | | | | | | | | | | | | | |
|---|---|---|---|---|---|---|---|---|---|---|---|---|---|
| Comparative Examples | 1 | A-11 | 75 | B-1 | 25 | C-1 | 1 | D-1 | 45 | 2 | 2 | — | 0.3 |
| | 2 | A-12 | 75 | B-1 | 25 | C-1 | 1 | D-1 | 45 | 2 | 2 | — | 0.3 |
| | 3 | A-1 | 100 | — | — | C-1 | 1 | D-1 | 45 | 2 | 2 | — | 0.3 |
| | 4 | A-1 | 97 | B-1 | 3 | C-1 | 1 | D-1 | 45 | 2 | 2 | — | 0.3 |
| | 5 | A-1 | 45 | B-1 | 55 | C-1 | 1 | D-1 | 45 | 2 | 2 | — | 0.3 |
| | 6 | A-1 | 75 | B-1 | 25 | — | — | D-1 | 45 | 2 | 2 | — | 0.3 |
| | 7 | A-1 | 75 | B-1 | 25 | C-1 | 0.05 | D-1 | 45 | 2 | 2 | — | 0.3 |
| | 8 | A-1 | 75 | B-1 | 25 | C-1 | 25 | D-1 | 45 | 2 | 2 | — | 0.3 |

| | | Mechanical properties | | Flame retardancy | | Amount of generated gas (mg/g) | | | | | |
|---|---|---|---|---|---|---|---|---|---|---|---|
| | | Flexural strength MPa | Flexural modulus of elasticity GPa | Melt Flow rate g/10 min | Evaluation | Total afterflame time sec | Total amount (exclusive of water content) | Component derived from polyamide | Component derived from phosphorus-based flame retardant | Die contamination | Mold release property pieces | Metal corrosion % |
| Examples | 26 | 97 | 2.2 | 73 | V-2 | 75 | 1.62 | 0.08 | 0.06 | E | 100 | 0.17 |
| | 27 | 314 | 15.5 | 10 | V-0 | 33 | 0.94 | 0.03 | 0.02 | E | 100 | 0.12 |
| | 28 | 330 | 16.3 | 5 | V-0 | 31 | 0.74 | 0.01 | 0.01 | E | 100 | 0.10 |
| | 29 | 204 | 8.7 | 16 | V-0 | 38 | 1.18 | 0.05 | 0.03 | E | 100 | 0.14 |
| | 30 | 345 | 16.7 | 18 | V-0 | 36 | 1.11 | 0.05 | 0.03 | E | 100 | 0.14 |
| | 31 | 175 | 8.7 | 24 | V-0 | 33 | 1.19 | 0.05 | 0.03 | E | 100 | 0.15 |
| | 32 | 224 | 10.5 | 15 | V-1 | 114 | 0.89 | 0.04 | 0.03 | E | 100 | 0.13 |
| | 33 | 220 | 10.2 | 17 | V-1 | 67 | 1.00 | 0.04 | 0.04 | E | 100 | 0.14 |
| | 34 | 219 | 10.1 | 18 | V-1 | 83 | 0.95 | 0.04 | 0.03 | E | 100 | 0.13 |
| | 35 | 223 | 10.0 | 23 | V-0 | 47 | 0.95 | 0.04 | 0.03 | E | 100 | 0.13 |
| | 36 | 220 | 9.9 | 30 | V-0 | 18 | 0.89 | 0.04 | 0.03 | E | 100 | 0.15 |
| | 37 | 210 | 9.7 | 23 | V-0 | 41 | 1.34 | 0.09 | 0.06 | G | 95 | 0.16 |
| | 38 | 203 | 9.6 | 19 | V-0 | 37 | 1.33 | 0.05 | 0.02 | E | 100 | 0.17 |
| Comparative Examples | 1 | 263 | 13.7 | 1.5 | V-0 | 34 | 1.47 | 0.21 | 0.03 | G | 80 | 0.14 |
| | 2 | 142 | 6.1 | 51 | V-1 | 63 | 1.38 | 0.10 | 0.05 | E | 100 | 0.15 |
| | 3 | 247 | 12.4 | 13 | not V-2 | >250 | 0.95 | 0.06 | <0.01 | E | 100 | 0.01 |
| | 4 | 240 | 11.2 | 15 | not V-2 | >250 | 1.02 | 0.06 | 0.01 | E | 100 | 0.04 |
| | 5 | | | | | | Taking out was impossible. | | | | | |
| | 6 | 224 | 10.6 | 22 | V-0 | 45 | 1.87 | 0.05 | 0.54 | P | 100 | 0.86 |
| | 7 | 223 | 10.3 | 21 | V-0 | 42 | 1.51 | 0.04 | 0.42 | P | 100 | 0.61 |
| | 8 | 152 | 7.8 | 10 | V-0 | 24 | 0.91 | 0.04 | 0.01 | E | 100 | 0.02 |

Examples 1 to 38 met the requirements of the present invention, and hence were excellent in mold release property and metal corrosion resistance at high temperatures as well as in mechanical properties, heat resistance and flame retardancy, and were small in the amount of generated gas at the temperature during molding processing.

As can be seen from a comparison of Examples 1, 7, 8 and 10 with Example 6, the inclusion of a monocarboxylic acid having a molecular weight of 140 or more as the monocarboxylic acid component of the semiaromatic polyamide used results in smaller amount of generated gas derived from the polyamide, lower die contamination and excellent mold release property. It can also be seen that the mold fluidity is high.

As can be seen from a comparison of Example 1 with Example 9, the use of an aliphatic monocarboxylic acid as the monocarboxylic acid component, as compared with the use of an aromatic monocarboxylic acid, results in a smaller amount of generated gas of the component derived from the polyamide, lower die contamination and excellent in mold release property.

As can be seen from a comparison of Example 1 with Example 4, the use of 1,10-decanediamine as the aliphatic diamine component, as compared with the use of 1,9-nonanediamine, results in higher mechanical properties.

As can be seen from a comparison of Examples 1 and 16 with Example 15, the use of a phosphinic acid salt and/or a diphosphinic acid salt as the phosphorus-based flame retardant results in higher flame retardancy.

As can be seen from a comparison of Example 1 with Examples 21 to 23, the use of the low-crystallinity boehmite as the inorganic aluminum compound, as compared with the use of other inorganic aluminum compounds, results in a smaller amount of generated gas derived from the phosphorus-based flame retardant and a suppressed metal corrosion. As also can be seen, Example 1 is shorter in the total afterflame time and excellent in flame retardancy.

As can be seen from a comparison of Examples 1, 29 and 30 with Example 31, the use of a fibrous reinforcing material as the reinforcing material, as compared with the use of a plate-like talc, results in higher mechanical properties.

As can be seen from a comparison of Example 1 and 33 to 36 with Example 32, the use of a flame retardant aid in combination with the phosphorus-based flame retardant results in higher flame retardancy.

As can be seen from a comparison of Example 1 with Example 37, the use of a phosphorus-based antioxidant results in a smaller amount of generated gas derived from the polyamide, lower die contamination, and excellent mold release property.

Comparative Example 1 was smaller in the content of the monocarboxylic acid component in the semiaromatic polyamide, and hence was larger in the amount of generated gas derived from the polyamide and poor in mold release property. Comparative Example 2 was larger in the content of the monocarboxylic acid component in the semiaromatic polyamide, and hence, as compared with Examples 1 to 5, lower in the mechanical properties and poor in flame retardancy.

Comparative Example 3 did not include the phosphorus-based flame retardant, and Comparative Example 4 was smaller in the content of the phosphorus-based flame retardant, and hence Comparative Examples 3 and 4 were poor in flame retardancy. Comparative Example 5 was larger in the content of the phosphorus-based flame retardant, and hence was not able to take out the strand during melt kneading, and hence was not able to obtain the resin composition pellet.

Comparative Example 6 did not include the inorganic aluminum compound, and Comparative Example 7 was smaller in the content of the inorganic aluminum compound, and hence Comparative Examples 6 and 7 were larger in the amount of generated gas derived from the phosphorus-based flame retardant, larger in the metal corrosion amount, and higher in the die contamination. Comparative Example 8 was larger in the content of the inorganic aluminum compound, and hence was lower in mechanical properties as compared with Examples 17 to 20.

REFERENCE SIGNS LIST

EX: Twin screw kneading extruder
D: Die
MP: Metal plate
R: Flow path of molten resin

The invention claimed is:

1. A semiaromatic polyamide resin composition comprising: a semiaromatic polyamide (A), a phosphorus-based flame retardant (B), an inorganic aluminum compound (C), and a phosphazene compound,
wherein a mass ratio (A/B) between the semiaromatic polyamide (A) and the phosphorus-based flame retardant (B) is 50/50 to 95/5;
an amount of the inorganic aluminum compound (C) is 0.1 to 20 parts by mass in relation to 100 parts by mass of a total amount of the semiaromatic polyamide (A) and the phosphorus-based flame retardant (B);
the semiaromatic polyamide (A) consists of an aromatic dicarboxylic acid component, an aliphatic diamine component and a monocarboxylic acid component;
the aliphatic diamine component is 1,10-decanediamine;
the monocarboxylic acid component includes a monocarboxylic acid having a molecular weight of 140 or more; and
a content of the monocarboxylic acid component is 0.3 to 4.0 mol % in relation to whole monomer components constituting the semiaromatic polyamide (A).

2. The semiaromatic polyamide resin composition according to claim 1, wherein the monocarboxylic acid component includes an aliphatic monocarboxylic acid.

3. The semiaromatic polyamide resin composition according to claim 2, wherein the aliphatic monocarboxylic acid is stearic acid.

4. The semiaromatic polyamide resin composition according to claim 1, wherein the aromatic dicarboxylic acid component includes terephthalic acid.

5. The semiaromatic polyamide resin composition according to claim 1, wherein the phosphorus-based flame retardant (B) is a phosphinic acid salt and/or a diphosphinic acid salt.

6. The semiaromatic polyamide resin composition according to claim 5, wherein the phosphinic acid salt is a compound represented by the following general formula (I), and the diphosphinic acid salt is a compound represented by the following general formula (II):

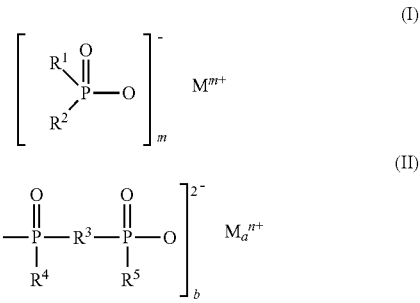

wherein in the formulas, $R^1$, $R^2$, $R^4$ and $R^5$ each independently represent a linear or branched alkyl group having 1 to 16 carbon atoms and/or a phenyl group; $R^3$ represents a linear or branched alkylene group having 1 to 10 carbon atoms, an arylene group having 6 to 10 carbon atoms, an arylalkylene group or an alkylarylene group; M represents a calcium ion, an aluminum ion, a magnesium ion or a zinc ion; m is 2 or 3; and n, a and b are integers satisfying a relation, 2×b=n×a.

7. The semiaromatic polyamide resin composition according to claim 1, wherein the inorganic aluminum compound (C) is one or more selected from the group consisting of aluminum oxide, boehmite and aluminum silicate.

8. The semiaromatic polyamide resin composition according to claim 1, further comprising a fibrous reinforcing material (D) in an amount of 5 to 200 parts by mass in relation to 100 parts by mass of a total amount of the semiaromatic polyamide (A) and the phosphorus-based flame retardant (B).

9. The semiaromatic polyamide resin composition according to claim 8, wherein the fibrous reinforcing material (D) is one or more selected from the group consisting of glass fiber, carbon fiber and metal fiber.

10. A molded body formed by molding the semiaromatic polyamide resin composition according to claim 1.

* * * * *